United States Patent
O'Laughlin et al.

(10) Patent No.: US 8,458,096 B2
(45) Date of Patent: Jun. 4, 2013

(54) SYSTEM AND METHOD OF CASHING A CHECK

(75) Inventors: Michael O'Laughlin, Alpharetta, GA (US); Douglas Berlon, Atlanta, GA (US); Malon Updike, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/250,350

(22) Filed: Sep. 30, 2011

(65) Prior Publication Data
US 2013/0085940 A1      Apr. 4, 2013

(51) Int. Cl.
*G06Q 40/00*   (2012.01)
(52) U.S. Cl.
USPC ............................................. 705/44
(58) Field of Classification Search
USPC .......................................... 705/44
See application file for complete search history.

(56) References Cited

U.S. PATENT DOCUMENTS

| | | | |
|---|---|---|---|
| 7,577,614 B1 * | 8/2009 | Warren et al. .................. | 705/43 |
| 8,104,676 B2 * | 1/2012 | Ramachandran .............. | 235/380 |
| 2008/0208762 A1 * | 8/2008 | Arthur et al. ................... | 705/79 |
| 2010/0198733 A1 * | 8/2010 | Gantman et al. ................ | 705/75 |
| 2011/0246316 A1 * | 10/2011 | Cincera ........................... | 705/17 |

* cited by examiner

*Primary Examiner* — Daniel Felten
*Assistant Examiner* — Clifford Madamba
(74) *Attorney, Agent, or Firm* — Michael Chan

(57) ABSTRACT

A system and method of cashing a check which reduces wait times and automates a very manual process. An example method includes capturing an image of the check, sending a request including an image file containing the image of the check to a check approval system, receiving an approval to cash the check from the check approval system, and submitting the image file and the approval during a check cashing transaction at a self-service terminal.

15 Claims, 3 Drawing Sheets

SYSTEM AND METHOD OF CASHING A CHECK

BACKGROUND

The present invention relates to check cashing and more specifically to a system and method of cashing a check.

Unbanked and underbanked consumers typically conduct check cashing transactions by visiting a third party check cashing entity.

It would be desirable to provide a system and method of cashing a check which gives unbanked and underbanked consumers the option of pre-staging a check cashing transaction using a mobile communication device, personal computer, or other computing device (e.g., scanner) to gain approval and complete the transaction by obtaining funds from a self-service terminal, such as an automated teller machine (ATM), Financial Kiosk or similar self service devices.

SUMMARY

In accordance with the teachings of the present invention, a system and method of cashing a check is provided.

An example method includes capturing an image of the check, sending a request including an image file containing the image of the check to a check approval system, receiving an approval to cash the check from the check approval system, and submitting the image file and the approval during a check cashing transaction at a self-service terminal.

DETAILED DESCRIPTION

Figure 1:
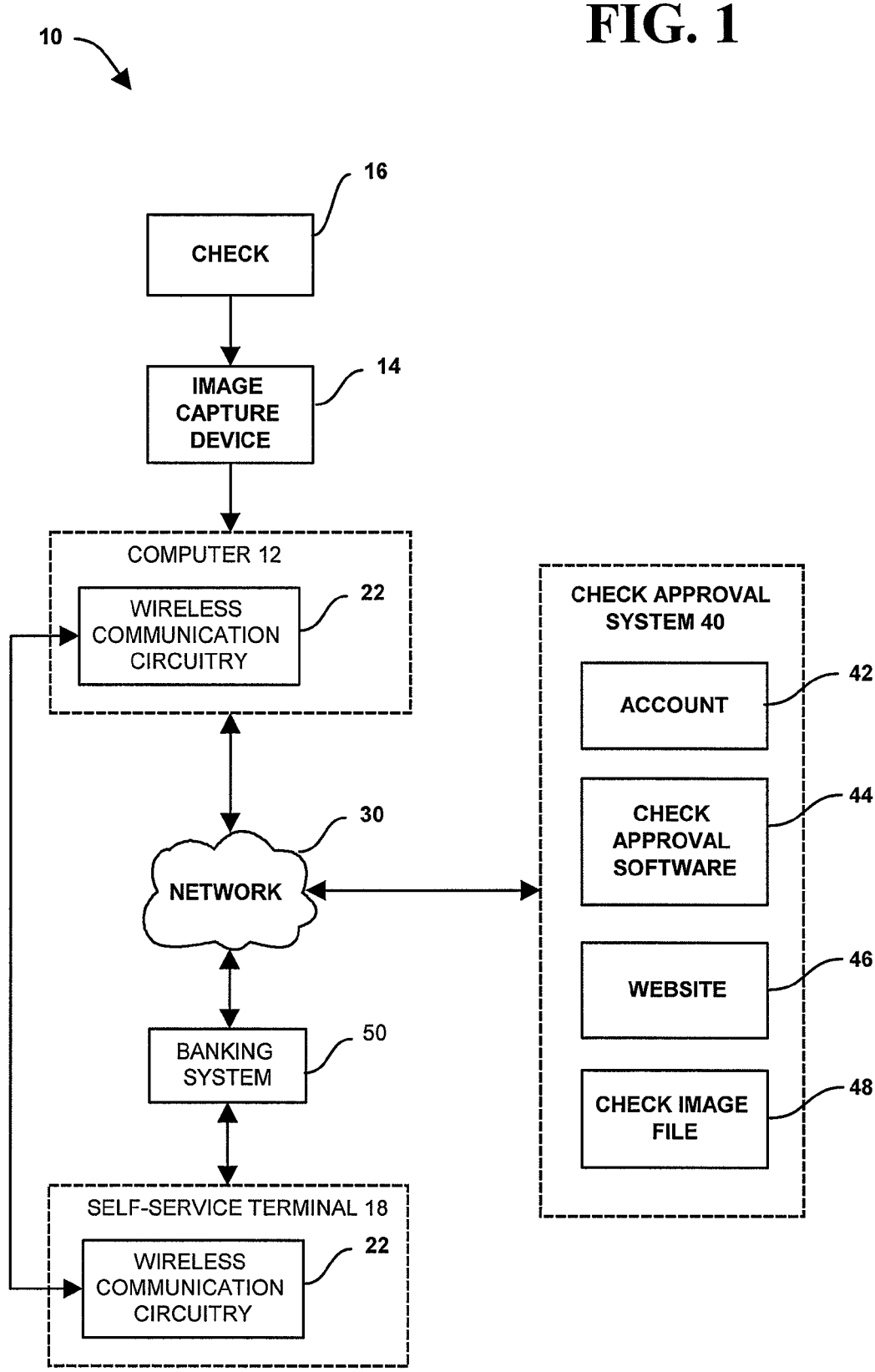
FIG. 1 is a block diagram of a check cashing system.

Turning now to FIG. 1, system 10 primarily includes computers 12 and self-service terminal (SST) 18. In an example embodiment, a person with a check 16 to be cashed uses computer 12 to pre-stage a check cashing transaction. The person further uses SST 18 to complete the check cashing transaction. SST 18 may be affiliated with a bank with which the person has a bank account or completely untied to any bank account, but approved through a third party risk provider.

Computer 12 may include, but not be limited to a smart phone or other portable or computer peripheral.

Computer 12 may include one or more computers. For example, computer 12 may include a personal computer used to obtain approval to cash check 16 and a portable computing device used to communicate with SST 18 during completion of the check cashing transaction. SST 18 may include, but not be limited to, a kiosk, automated teller machine (ATM) or other SST.

In an alternative embodiment, computer 12 and SST 18 may be the same computer, the person performing the check cashing transaction at a single kiosk, ATM or other SST.

Computer 12 and SST 18 include a processor, memory, and program and data storage. Computer 12 and SST 18 may execute an operating system such as a Microsoft operating system. Computer 12 and SST 18 execute other computer software that may be stored in a computer readable medium, such as a memory.

Computer 12 and SST 18 further include wired or wireless communication circuitry 20 and 22 for directly connecting computer 12 and SST 18. Wireless communication circuitry 20 and 22 may include standard near field communication (NFC) circuitry.

Computer 12 and SST 18 further include graphics circuitry for connecting to a display, network circuitry for connecting to network 30, and other circuitry for connecting to other peripherals, such as a printer, an input device (e.g., a mouse, a keyboard, a touch overlay to the display). Computer 12 may use such circuitry to connect image capture device 14. SST 18 may include and use such circuitry to connect any one or more of a card reader, a biometric reader, such as a fingerprint reader, a barcode reader, or other peripheral necessary for the purpose of SST 18.

Network 30 may include any combination of wireless or wired networks, including a global communication network, also known as the Internet.

In one example embodiment, computer 12 connects to check approval system 40 to receive approval to cash check 16. Computer 12 captures an image of check 16 using image capture device 14 and sends a check image file 48 to check approval system 40.

Computer 12 executes web browser software to allow computer 12 to display information in a format established by the World Wide Web (WWW or "web"). Web browser software may include commercially available web browser software, such as Microsoft® Internet Explorer web browser software. Computer 12 connects to a web server of check approval system 40 through website 46.

Computer 12 downloads web pages from website 46 that allow the person with check 16 to establish an account 42, to login to account 42, to upload check image file 48, to request approval for check 16, and to obtain approval for check 16. The web pages may also facilitate control of image capture device 14 in order to capture an image of check 16.

Computer 12 may alternatively or in addition download application software to facilitate approval. For example, check approval system 40 may provide check approval request software 44 for download through website 46.

In one example embodiment, check approval request software 44 may be written in a programming language such as the Java programming and be hosted within the browser software.

As another example, check approval request software 44 may include a script, such as JavaScript, combined with hypertext markup language (HTML) or other suitable web page language.

If computer 12 is a mobile computing device, such as a smart phone, check approval request software 44 may include a software applet written to be executed within the operating system of the smart phone.

Check approval request software 44 may operate image capture device 14 to facilitate a request for check approval. For example, check approval request software 44 may communicate directly with a software driver of image capture device 14.

As another example, check approval request software 44 may communicate indirectly with a software driver of image capture device 14 through a protocol or application programming interface (API), such as a TWAIN standard API.

Alternatively, check approval request software 44 may prompt the person for a file 48 containing an image of check 16 previously captured by the customer using a different software application.

In another example embodiment, SST 18 connects to check approval system 40 to receive approval to cash check 16. SST 18 captures an image of check 16 using image capture device 14 and sends a check image file 48 to check approval system 40.

Image capture device 14 captures an image of check 16 and stores the image as image file 48. Image capture device 14 is coupled to computer 12 and may include a document scanner or camera.

For example, image capture device 14 may include a built-in camera within a mobile communication device, such as a smart phone.

As another example, image capture device 14 may include a document scanner attached to a personal computer via a universal serial bus (USB) or other connection.

As another example, image capture device 14 may include a check reader module of a kiosk, ATM or other SST.

Image file formats may include "TIF", "GIF", "JPG", "BMP", "PNG", or any other format as required by check approval system 40, such as the X9.37 standard format. Check approval system 40 may also require that image file 48 have a predetermined color depth and/or resolution. The payer must acquire and operate an image capture device 14 in satisfaction of these requirements.

Check 16 may include any document which serves as a written, legally negotiable order directing a bank where the payer has an account to pay money. For example, check 16 may include a personal check, a money market check, or other type of check. Check 16 is filled out and signed by the payer.

Check approval system 40 receives check approval requests from computer 12, and either approves or disapproves the requests. If check approval system 40 approves a request, check approval system 40 may issue one or more indicia of approval, such as an approval number to computer 12. The indicia may be part of a modified image of check 16. Computer 12 may display the approval number and the indicia and save or store them locally.

Check approval system 40 may be operated by a bank where the person wishing to cash check 16 has an account or a third party check verification service.

The person wishing to cash check 16 uses computer 12 to transfer the indicia of approval and image file 48 to SST 18. Wireless communication circuitry 20 in computer 12 establishes a connection with wireless communication circuitry 22 in SST 18. Computer 12 then uploads the indicia of approval and image file 48 to SST 18.

SST 18 executes transaction software 24, which facilitates a plurality of transactions including a check cashing transaction. Transaction software 24 displays one or more screens including a selection to begin the check cashing transaction.

In an example embodiment in which computer 12 includes a smartphone or other portable computing device, the person pre-stages the transaction before using SST 18. Transaction software 24 prompts the person to upload the indicia of approval and image file 48 from computer 12. Transaction software 24 receives the indicia of approval and image file 48.

In another example embodiment in which the person performs the entire check cashing transaction at SST 18, transaction software 24 prompts the person to provide check 16. Transaction software 24 controls image capture device 14 to capture an image of check 16. Transaction software 24 sends image file 48 to check approval system 40 and receives the indicia of approval. SST 18 may connect to check approval system 40 through banking system Further processing may include performing a verification process and truncating check 16 in a known way. For example, transaction software 24 may perform an optical character recognition (OCR) process on the image and/or a magnetic ink character recognition (MICR) process to identify and verify important information. Following processing of check 16, transaction software 24 may dispense currency or currency equivalent, such as a stored value card, or top off a stored value card or applied to other options like mobile wallets. Alternatively, transaction software 24 may credit a bank account of the person.

Figure 2:
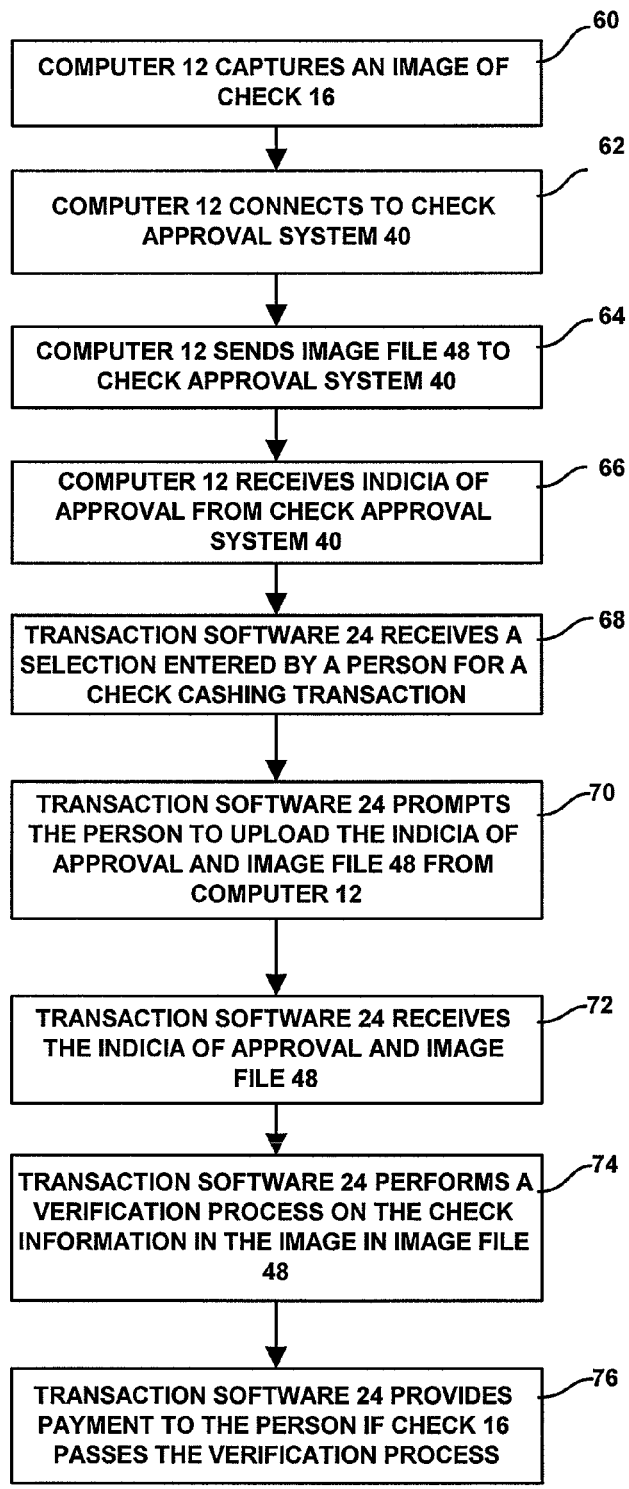
FIG. 2 is a flow diagram illustrating a first example check cashing method.

Turning now to FIG. 2, an example check cashing method is illustrated in detail beginning with step 60.

Steps 60-66 relate to pre-staging steps using computer 12. Pre-staging the check cashing transaction reduces wait time and confusion.

In step 60, computer 12 captures an image of check 16. For example, if computer 12 is a smartphone with a camera, the smartphone uses the camera to capture an image of check 16.

In step 62, computer 12 connects to check approval system 40. The person may login with pre-established credentials.

In step 64, computer 12 sends image file 48 to check approval system 40.

In step 66, computer 12 receives an approval, with indicia of approval, or a disapproval from check approval system 40. The approval or disapproval may come in the form of a text message or e-mail message, for example.

Steps 68-76 relate to check cashing transaction steps at SST 18.

In step 68, transaction software 24 receives a selection entered by the person for a check cashing transaction.

In step 70, transaction software 24 prompts the person to upload the indicia of approval and image file 48 from computer 12.

In step 72, transaction software 24 receives the indicia of approval and image file 48. SST 18 may establish an NFC connection with computer 12 to receive image file 48.

In step 74, transaction software 24 performs a verification process on the check information in the image in image file 48.

In step 76, transaction software 24 provides payment to the person if check 16 passes the verification process. Transaction software 24 may dispense currency or currency equivalent, such as a stored value card, or top off a stored value card or applied to other options like mobile wallets. Alternatively, transaction software 24 may credit a bank account of the person.

Figure 3:
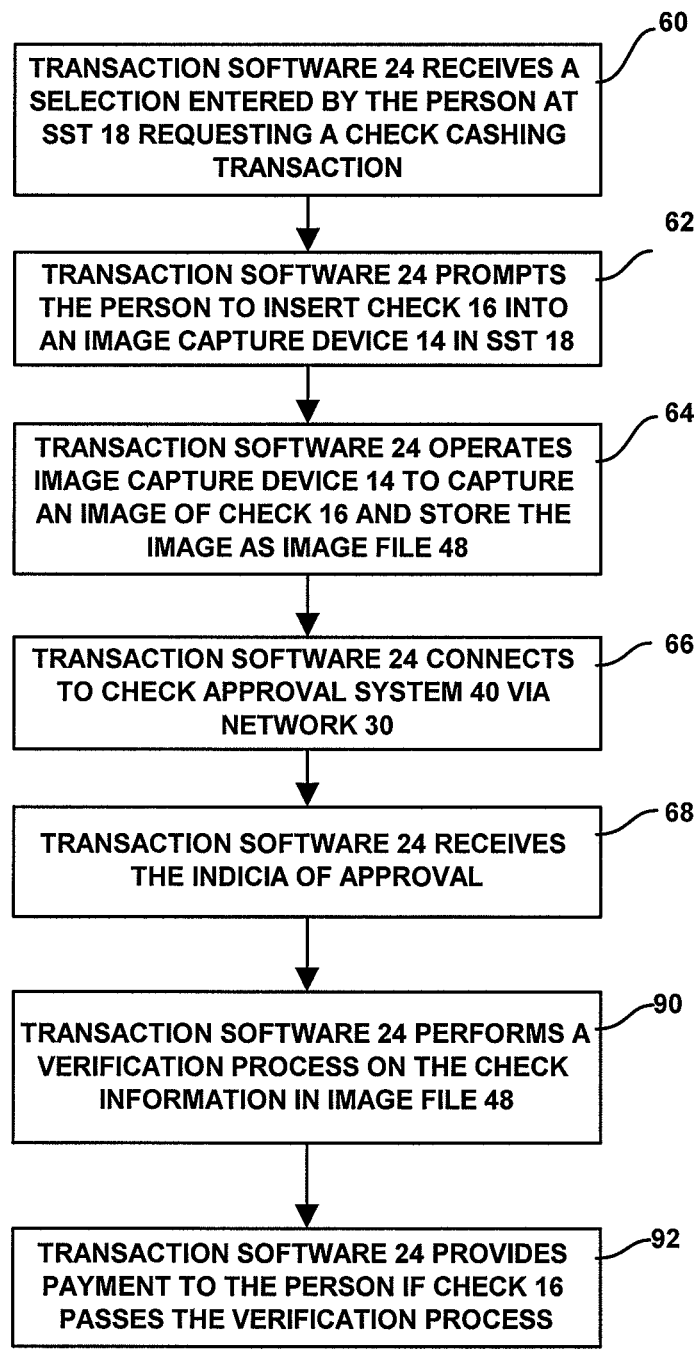
FIG. 3 is a flow diagram illustrating a second example check cashing method.

Turning now to FIG. 3, another example check cashing method is illustrated in detail beginning with step 80. In this example, the person performs the entire check cashing transaction at SST 18.

In step 80, transaction software 24 receives a selection entered by the person at SST 18 for a check cashing transaction.

In step 82, transaction software 24 prompts the person to insert check 16 into a check reader module in SST 18.

In step 84, transaction software 24 operates image capture device 14, which may include a check reader module, to capture an image of check 16 and store the image as image file 48.

In step 86, transaction software 24 connects to check approval system 40 via network 30. Transaction software 24 may pass the person's credentials and image file 48 with a request for approval to check approval system 40, or display a screen from check approval system 40 to allow the person to login, send image file 48, and make the request.

In step 88, transaction software 24 receives an approval, with indicia of approval, or a disapproval from check approval system 40. Transaction software 24 may further receive an indication that the request is pending approval or disapproval and may return check 16 and prompt the person to return to SST 18 after a predetermined time period. After the predetermined time period, the person may receive the approval or disapproval in the form of a text message or e-mail message, for example, on a personal computer or mobile communication device.

If transaction software 24 approves check 16, transaction software 24 retains check 16. Other, transaction software 24 returns check 16 if check 16 is disapproved or if approval is pending for the predetermined time period.

In step 90, transaction software 24 performs a verification process on the check information in the image in image file 48. Transaction software 24 may display verification a result.

In step 92, transaction software 24 provides payment to the person if check 16 passes the verification process. Transaction software 24 may dispense currency or currency equivalent, such as a stored value card, or top off a stored value card or applied to other options like mobile wallets. Alternatively, transaction software 24 may credit a bank account of the person.

Although the present invention has been described with particular reference to certain preferred embodiments thereof, variations and modifications of the present invention can be effected within the spirit and scope of the following claims.

What is claimed is:

1. A method of operating a mobile communication device to enable a user of the mobile communication device to pre-stage a check cashing transaction at a location which is remote from location of a self-service terminal and to enable the user to complete the check cashing transaction at the location of the self-service terminal, the method comprising:
   capturing an image of a physical check by a camera of the mobile communication device at the location which is remote from location of the self-service terminal;
   electronically by a computer, establishing a network connection with a check approval system by the mobile communication device;
   electronically by a computer, sending at a first time a request including an image file containing the image of the check to the check approval system via the network connection by the mobile communication device to obtain approval from the check approval system to cash the check;
   electronically by a computer, receiving an approval file containing an indicia of approval to cash the check from the check approval system via the network connection by the mobile communication device and thereby completing pre-staging of the check cashing transaction; and
   electronically by a computer, wirelessly sending at a second time which is after the first time the image file containing the image of the check and the approval file containing the indicia of approval to the self-service terminal by the mobile communication device when the user arrives at the location of the self-service terminal to complete the check cashing transaction.

2. The method of claim 1, further comprising:
   electronically by a computer, wirelessly receiving payment for the check from the self-service terminal by the mobile communication device; and
   electronically by a computer, storing the payment in a mobile wallet by the mobile communication device.

3. The method of claim 1, wherein the indicia of approval comprises part of a modified image of the check.

4. The method of claim 1, wherein the indicia of approval comprises a text message.

5. The method of claim 1, wherein the indicia of approval comprises an e-mail message.

6. The method of claim 1, wherein electronically by a computer, sending at a first time a request comprises connecting to a website of the check approval system and uploading the image file containing the image of the physical check.

7. A method of operating a self-service terminal to enable a user to complete a check cashing transaction which has been pre-staged by the user using a first computing device at a location which is remote from location of the self-service terminal, the method comprising:
   electronically by a computer, receiving from a second computing device of the user an image file which contains an image of a check to be cashed when the user arrives at location of the self-service terminal, wherein (i) the first computing device comprises a personal computer of the user for pre-staging the check cashing transaction, and (ii) the second computing device is different from the first computing device and comprises a mobile communication device of the user for completing the check cashing transaction;
   electronically by a computer, processing the check image contained in the image file to verify information associated with the check to be cashed;
   electronically by a computer, receiving from the second computing device of the user an approval file which contains an indicia of approval to cash the check, wherein the indicia of approval has been obtained from a check approval system when the check cashing transaction was being pre-staged by the user using the first computing device; and
   providing cash to the user to complete the check cashing transaction when the information associated with the check to be cashed is verified and the indicia of approval is received from the second computing device of the user.

8. The method of claim 7, wherein electronically by a computer, processing the check image contained in the image file to verify information associated with the check to be cashed includes performing an optical character recognition (OCR) process on the check image to identify and verify the information associated with the check to be cashed.

9. The method of claim 7, wherein providing cash to the user to complete the check cashing transaction includes dispensing currency to the user.

10. A self-service terminal for enabling a user to complete a check cashing transaction which has been pre-staged by the user using a computing device at a location which is remote from location of the self-service terminal, the self-service terminal comprising:
    a computer;
    a computer medium;
    a display; and
    transaction software tangibly embodied on the computer medium and, when executed by the computer, displays one or more prompt screens on the display to prompt a user to (i) upload an image file which contains an image of a check to be cashed, and (ii) upload an approval file which contains an indicia of approval to cash the check when the user arrives at the self-service terminal and desires to complete a check cashing transaction which has been pre-staged by the user using the computing device at the location which is remote from the location of the self-service terminal.

11. The self-service terminal of claim 10, wherein the indicia of approval comprises part of a modified image of the check.

12. The self-service terminal of claim 10, wherein the indicia of approval comprises a text message.

13. The self-service terminal of claim 10, wherein the indicia of approval comprises an e-mail message.

14. The self-service terminal of claim 10, wherein the transaction software, when executed by the computer, controls a cash dispenser to dispense currency to the user when a pre-staged check cashing transaction has been completed at the self-service terminal.

15. The self-service terminal of claim 10, wherein the transaction software, when executed by the computer, displays a single prompt screen on the display to prompt a user to upload both an image file which contains an image of a check to be cashed and an approval file which contains an indicia of approval to cash the check.

\* \* \* \* \*